United States Patent [19]
Hornschuch

[11] 3,936,926
[45] Feb. 10, 1976

[54] METHOD OF COUPLING COMPRESSOR IMPELLERS AND SHAFTS

[75] Inventor: Hanns Hornschuch, Easton, Pa.

[73] Assignee: Ingersoll-Rand Company, Woodcliff Lake, N.J.

[22] Filed: June 11, 1975

[21] Appl. No.: 585,999

Related U.S. Application Data

[60] Continuation of Ser. No. 444,740, Feb. 22, 1974, abandoned, which is a division of Ser. No. 349,656, April 10, 1973, Pat. No. 3,826,587.

[52] U.S. Cl. .............................. 29/525; 29/156.8 R
[51] Int. Cl.² ......................................... B23P 19/02
[58] Field of Search .......... 29/525, 156.8 R; 415/60, 415/61, 66; 74/413; 184/6.12; 417/360

[56] References Cited
UNITED STATES PATENTS

| | | |
|---|---|---|
| 2,397,382 | 3/1946 | Smith .................................. 287/126 |
| 2,883,838 | 4/1959 | Veitch, Jr. ................................. 64/7 |
| 3,526,958 | 9/1970 | Grant ............................... 165/182 X |
| 3,643,312 | 2/1972 | Shriver ........................... 29/157.3 B |

*Primary Examiner*—Victor A. DiPalma
*Attorney, Agent, or Firm*—Bernard J. Murphy

[57] ABSTRACT

The method involves forming an impeller with a slightly out-of-round hole in the center, and an impeller shaft with a complementary out-of-round peripheral surface, slidably engaging the impeller and shaft together, and then rotationally torquing either the impeller or shaft (relative to the other) to effect a binding lock-up of the two.

1 Claim, 8 Drawing Figures

METHOD OF COUPLING COMPRESSOR IMPELLERS AND SHAFTS

This is a continuation of application Ser. No. 444,740 filed Feb. 22, 1974, now abandoned, and which was a division of application Ser. No. 349,656, filed Apr. 10, 1973 which issued as U.S. Pat. No. 3,826,587 on July 30, 1974 to Hanns Hornschuch for a Centrifugal Gas Compressor Unit.

This invention pertains to gas compressors, and in particular to a high speed multi-housing, multi-stage centrifugal gas compressor unit, for high compression ratios, having as its primary application natural gas service such as gathering, pipeline feed, gas injection and gas lift.

Present day centrifugal compressors used for natural gas service employ two, or three multi-stage centrifugal compressor units arranged "in line", driven through a step-up gear, and coupled through high-speed couplings. This results in a very lengthy machinery arrangement which is difficult to line up and to keep in alignment. Such arrangments are very susceptible to vibration, when the alignment becomes distorted. The individual compressor units are vibration-sensitive because of the long shaft overhangs, particlarly on the thrust bearing end. Compressor unit maintenance and servicing are time consuming, because the housings or casings of some of the machines, and usually portions of their associated piping, must be completely removed from a baseplate to gain access. So also, the in line arrangment requires a very elongate baseplate, which is space consuming, and therefore costly, particularly wherein the machinery is mounted on an off-shore platform.

It is, therefore an object of this invention to set forth an improved centrifugal gas compressor unit which avoids the aforenoted limitations in the prior art.

Another object of the invention is to teach a centrifugal gas compressor unit comprising a plurality of separate, elongate, gas compressor housings; a plurality of successive gas compressing stages within each of said housings; means for admitting gas to a first of said housings; means for discharging compressed gas from a last of said housings; means for communicating gas between each of said housings for successive gas compression; said stages each comprising a bladed gas compressor impeller and a vaned diffusor; a shaft confined within each of said housings, rotatably supporting said impellers; bearing means interposed between each of said shafts and housings for supporting said shafts for rotation; a gear housing, having parallel spaced apart walls, integral with said compressor housings; said compressor housings extending in parallel axes from, and perpendicular to, one of said walls of said gear housing; each of said shafts extending through both of said walls, and having a hollow gear shaft concentrically engaged therewith; each of said gear shafts carries gear means intermediate said walls; an idler gear, rotatably supported by and between said walls, drivingly engaged with a plurality of said gear means; a driving gear, rotatably supported by an between said walls, drivingly engaged with said idler gear at at least one of said gear means; and means replaceably coupled to said compressor housings for retaining said stages and impeller shafts in said compressor housings; wherein said stages and impeller shafts are slidably removable from said compressor housings, and from said gear housing, via ends of said compressor housings opposite said one wall, upon removal of said retaining means.

A feature of this invention comprises a multi-housing compressor having a plurality of gas compressing stages in each of parallel housings, the housings being integral with and extending perpendicularly from a gear housing. Rotor assemblies and associated diffusors are slidably replaceable from the respective housings, obviating any requirement to dismantle the gear housings. While the housings each receive gas, sequentially, for further compression, impellers and shafts in a plurality of the compressor housings are of identical weight, with the impellers thereof of identical axial length albeit of differing diameters.

Further objects and features of this invention will become more apparent by reference to the following description taken in conjunction with the accompanying figures, in which.

Figure 1:
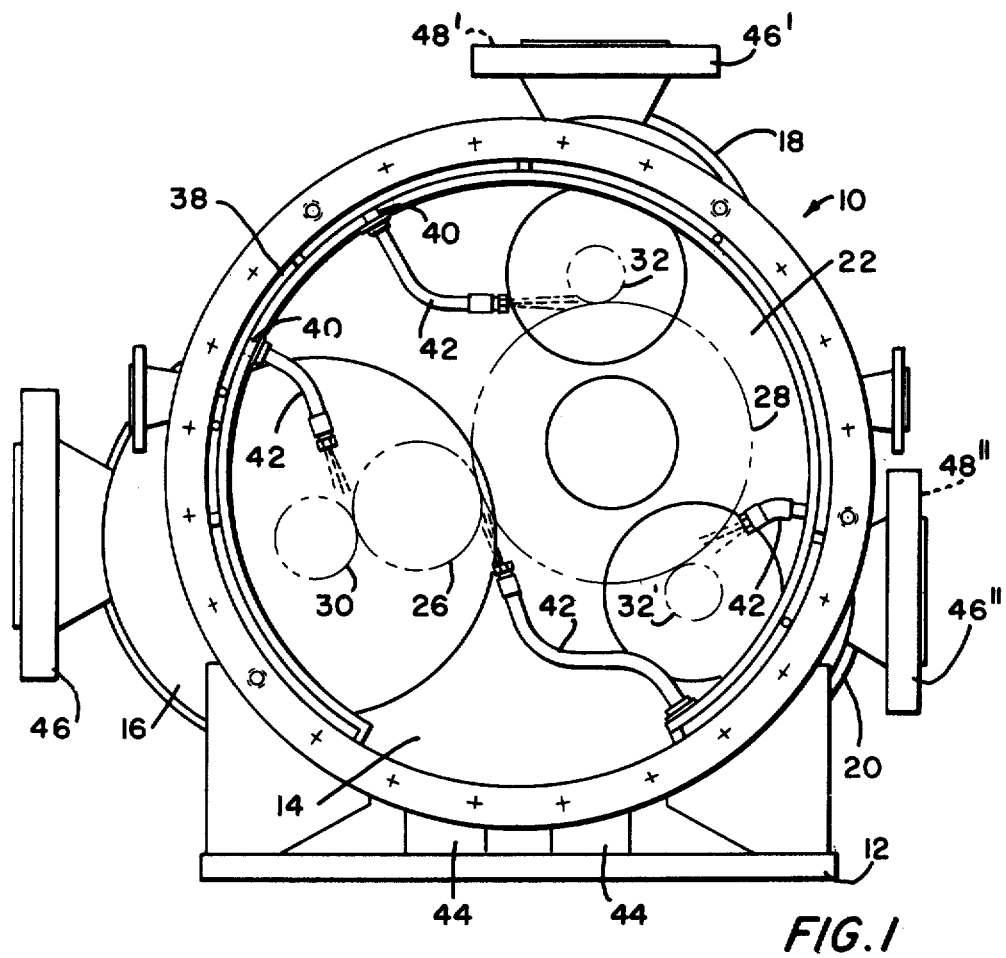
FIG. 1 is a front, elevational view of an embodiment of the novel centrifugal gas compressor, according to the invention, with the cover plate removed for purposes of clarity.
Figure 3:
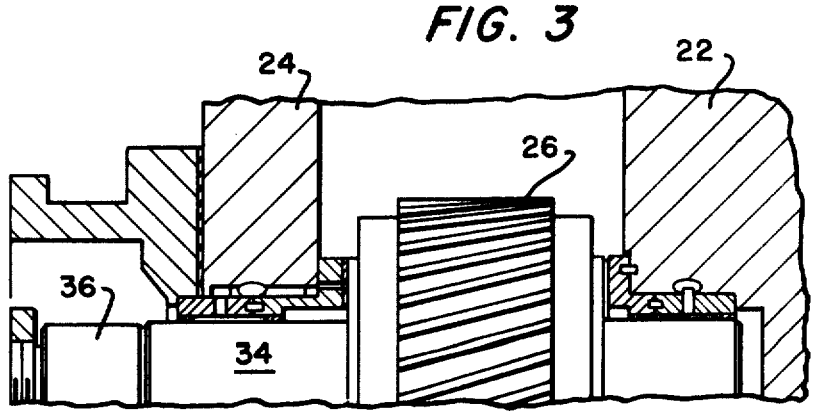
FIG. 3 is a fragmentary and half axial illustration of the driving gear within the gear housing.
Figure 2:
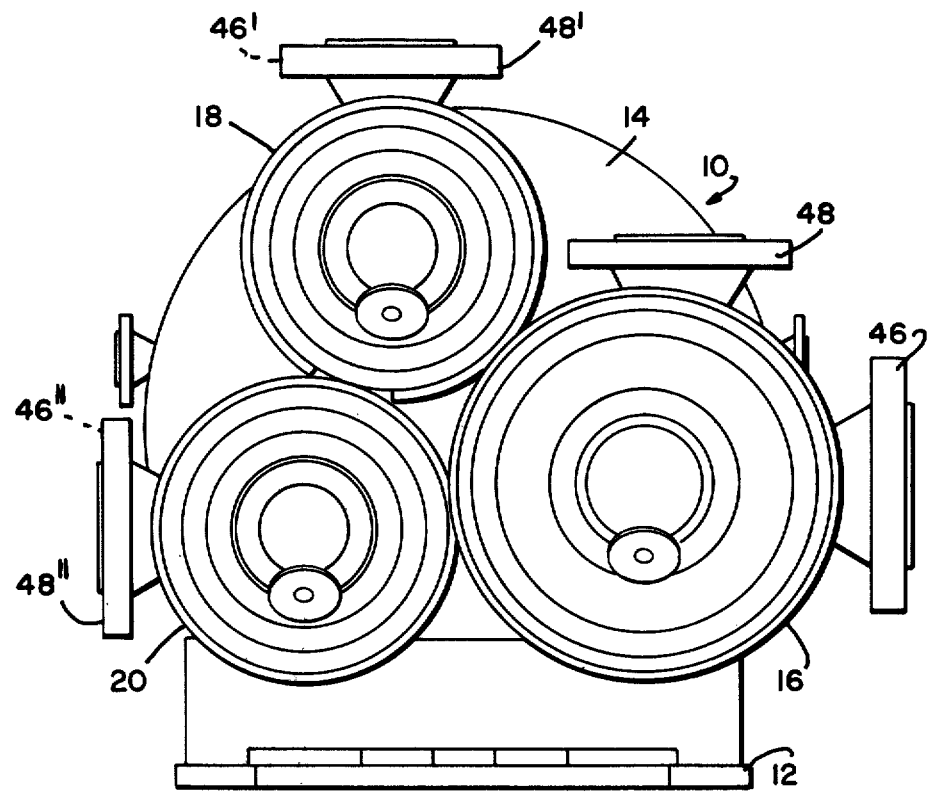
FIG. 2 is a rear elevational view of the embodiment of Fig. 1.
Figure 4:
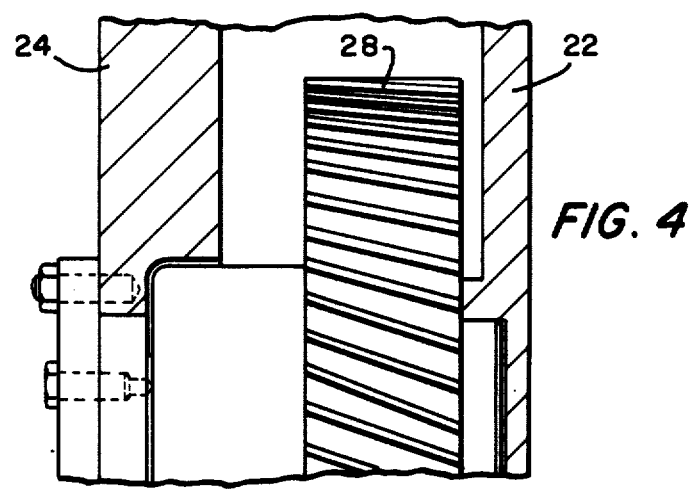
FIG. 4 is a fragmentary view of the idler gear within the gear housing.

As shown in FIGS. 1 and 2 the compressor 10, according to one embodiment, comprises a baseplate 12 which supports a gear housing 14. A plurality of three barrels or compressor housings 16, 18 and 20, are integral with the gear housing, and, extend therefrom, perpendicularly, in parallel axes. The gear housing 14 is defined by an inner wall 22 and an outer wall or cover plate 24. Within these walls a driving gear 26 and an idler gear 28 are rotatably mounted as shown in FIGS. 3 and 4. Driving gear 26 (FIG. 1) is in mesh with gear 30 of the first compressor housing 16, and with the idler gear 28. In turn, idler gear 28 is in mesh with gears 32 and 32' of the second and third compressor housings 18 and 20, respectively. Driving gear 26 is mounted on a shaft 34 which has a coupling end 36 projecting from the outer wall or cover plate 24, whereat a prime mover can be coupled to impart driving torque to the gear train.

Figure 5A:
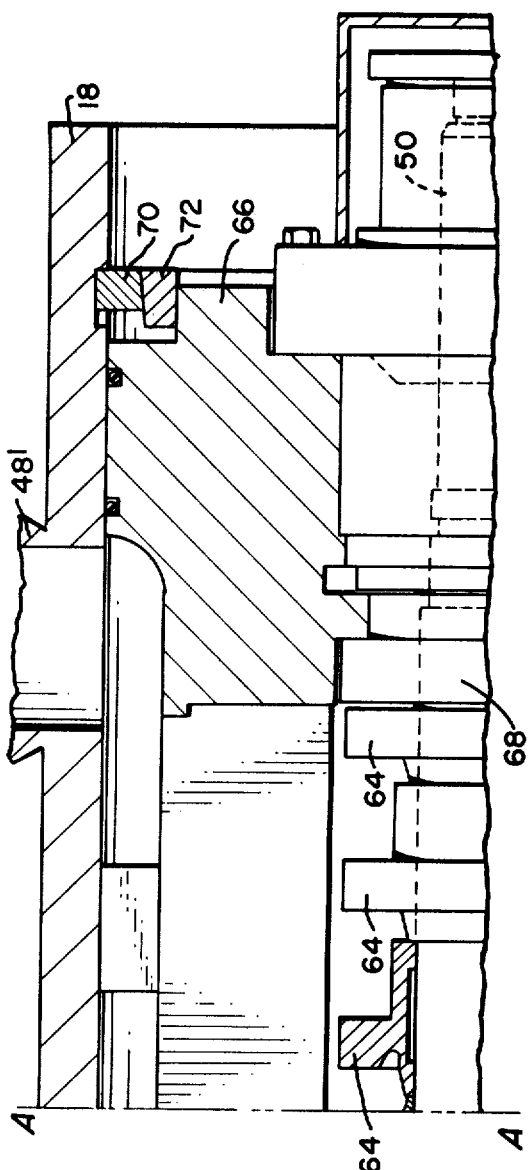
FIGS. 5 and 5A are broken, half axial views partly in cross-section, of the second compressor housing. Views 5 and 5A are broken on section lines A-A and are to be understood to be substantially symmetrical about the axial centerline thereof.
Figure 5:
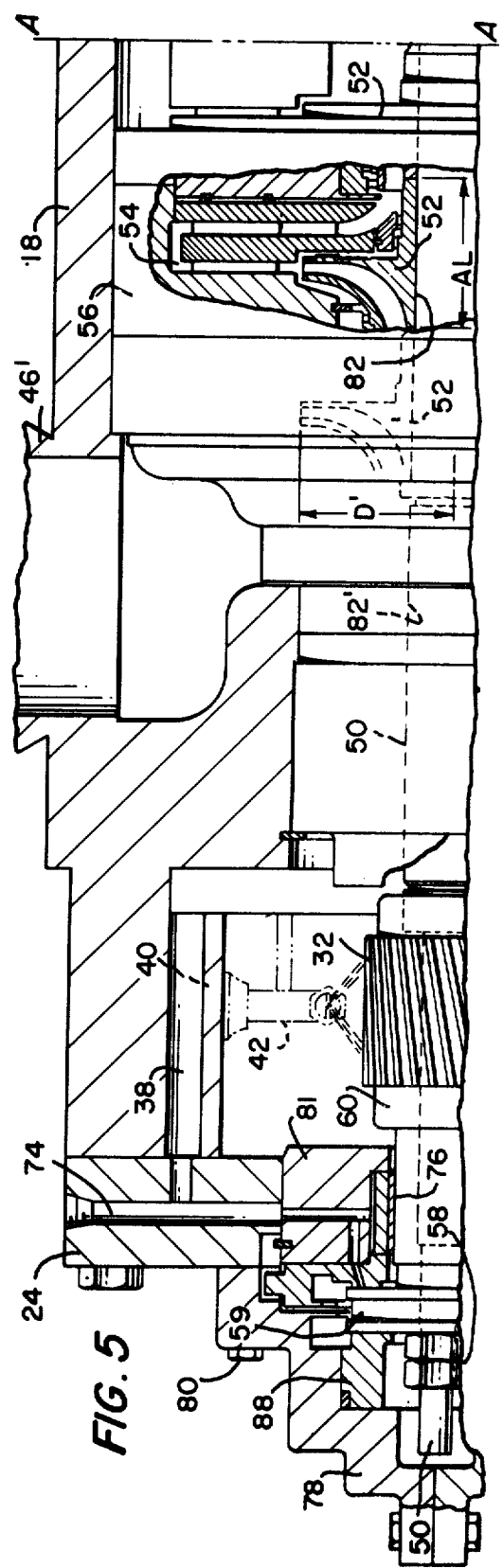

The gear housing 14 confines therewithin a reservoir 38, shown in FIGS. 1 and 5. Reservoir 38 has a plurality of outlet ports 40 which receive conduits 42. The conduits 42 are flexible and are conformed to open onto those locations within the gear housing 14 whereat the gears of the gear train mesh. A pair of limbs 44 disposed between the baseplate 12 and gear housing 14 have conduits or passageways (not shown) formed therein, and lubricant discharged by conduits 42 is scavaged therethrough for collection in a sump (not shown) mounted therebelow.

The several housings have inlet and outlet flanged ducts for admitting gas, sequentially to each of the housings in turn. Accordingly, inlet flanged duct 46 admits gas to the first housing 16, this housing having an outlet flanged duct 48. The latter duct, by means of piping (not shown) communicates with the inlet flanged duct 46' of the second compressor housing 18, and gas discharged therefrom is passed through its outlet flanged duct 48' to compressor housing 20. The latter also has both an inlet flanged duct 46'' and an outlet flanged duct 48'' for discharging the final, totally compressed gas product to a using end item (or to storage).

In FIGS. 5 and 5A, only one compressor housing, specifically the second compressor housing 18, is shown.

However, the parts emplacement and cooperation are sufficiently similar, in housing 16 and 20, so illustration of housing 18 only, is deemed to be adequate.

An impeller shaft 50 is rotatably carried within the housing 18 and mounts impellers 52 for rotation in cooperative adjacency to diffusors 54. Diffusors 54 are supported within a diffusor housing 56 according to a method well known in the prior art. Locking nuts 58 threadedly fastened to the gear housing end of the shaft 50 secure the shaft within the gear housing 14, against a thrust collar 59. A hollow gear-shaft 60 is rotatably engaged with shaft 50 (by conventional means) and has formed thereon the gear 32 which derives rotary power from the driving gear 26. A number of impeller dummies 64 are carried on the other end of the impeller shaft 50. The dummies 64 are of the same axial length as each of the impellers 52 so that when it is desired to increase or decrease the compressor housing capability it remains only to substitute impellers for one or more of the dummies 64, or vice versa. The rotor assembly, comprising the impeller shaft 50, the impellers 52 and the dummies 64, together with the diffusors 54 and housing 56, are slidably removable, as a unit, from the end of housing 18 which is most remote from the gear housing 14, upon removal of retainer 66 whereupon bench dismantling of the unit can follow. Retainer 66 is engaged with an end seal 68 for securing the removable unit in the housing 18. Retainer 66, in turn, is held within the housing by a split ring 70 and an retaining ring 72. Both rings have surfaces which define a tapered wedge interface. Mounting and tensioning hardware (not shown) secures ring 72 to the retainer 66.

A lubricant passageway 74 is formed within the housing wall or cover plate 24 for admitting lubricant into the reservoir 38, and also for conducting lubricant to shaft bearing 76. It is to be noted that reservoir 38, in addition to serving as a lubricant manifold, also serves to suppress the emission of gear noise from the gear housing 14. As FIGS. 1 and 5 evidence, the reservoir extends fully across the housing 14, and substantially envelops the gear train. In defining a hollow, walled structure, which is substantially closed, it presents a sound buffer intermediate the gear train and the external periphery of the housing 14.

The locked end of shaft 50 is enclosed within a cover 78 secured by means of bolts 80 to the gear housing 14, cover 78 being replaceable for service of the rotor assembly, To replace the slidably removable unit (rotor assembly, diffusors, diffusor housing) from the housing 18 it remains only to remove cover 78, unfasten the lock nuts 58 and, using a gear puller or the like on thurst collar 59, withdraw the hollow gear shaft 60 from the impeller shaft 50. Cover plate 24 carries bearing 76 within a bearing housing 81 in an aperture, and both are removed therethrough with gear shaft 60. Then by removing rings 70 and 72, and the retainer 66, the whole unit can be withdrawn without having to disassemble the gear housing 14.

Figure 7:
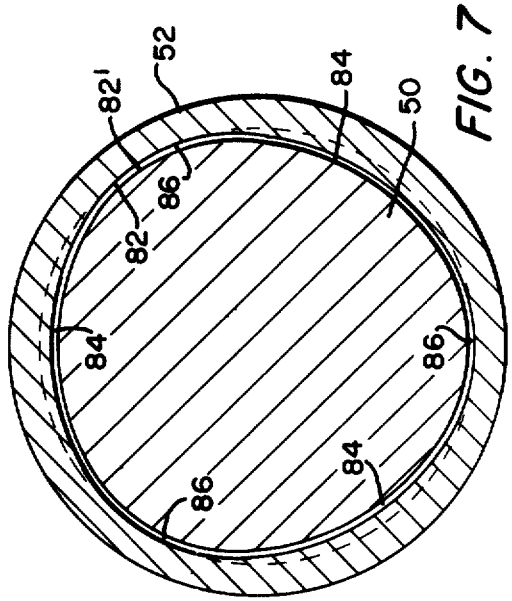
FIG. 7 is a simple diagrammatic illustration representative of the novel arrangement set forth herein for coupling the impellers to the impeller shafts.

It is the teaching of this invention to secure the impeller 52 to the impeller shaft 50 without any requirement for keying, bolting, or heating. With reference to FIG. 7 it will be noted that the nominal inside diameter 82 of the impellers corresponds substantially with the nominal outside diameter 82' of the impeller shaft. However, the impeller mounting bores as well as the outside diameter of the shaft are formed as something other than true circles. That is, as shown in FIG. 7, a true circular surface if formed about the shaft, and within the impellers, would be represented by the dashed lines and the solid lines contiguous therewith. However, the impeller bores and the shaft outside diameter or periphery are formed with eccentric surfaces 84 which, therebetween, define three lobes 86. With the impeller bores and the shaft surface aligned, lobe-for-lobe, the impellers are freely, slidably mountable onto the shaft. Then, by forcefully torquing the impellers on the shaft, the priorly aligned lobes separate, rotationally, and effect a binding, circumferential-wedging relationship with adjacent surfaces 84. It is a teaching of this invention to torque these lobes 86 into such a bound engagement with the adjacent eccentric surfaces 84, as will be greater than any contrary torquing force experienced by the impellers while compressing gas. When necessary to remove an impeller it remains only to reverse the torque lock-up rotation to again slidably align the lobes of both of the impellers and the shaft, whereupon the impellers can be slid off the shaft.

This teaching, of circumferentially wedging the impellers 52 (and 52') onto the impeller shaft 50 (and 50') is, of course, particularly useful in the disclosed gas compressor unit 10. However, it has a universal applicability whenever and wherever it is desired to couple a first element to a second element. Thus, all broad practices wherein one element is secured to another, by the torqued coupling arrangement, and the method of its execution, as disclosed herein, is considered to be within the ambit of my teaching.

The gear train, as is evidenced in FIGS. 3, 4, and 5, comprises helical gears which are so oriented as to counter the thrust normally developed by the rotor assembly. Therefore, the thrust bearing 88 (FIG. 5) need not be so large as ordinarily would be necessary. This offers no small economies in machine-space requirements and costs.

Figure 6:
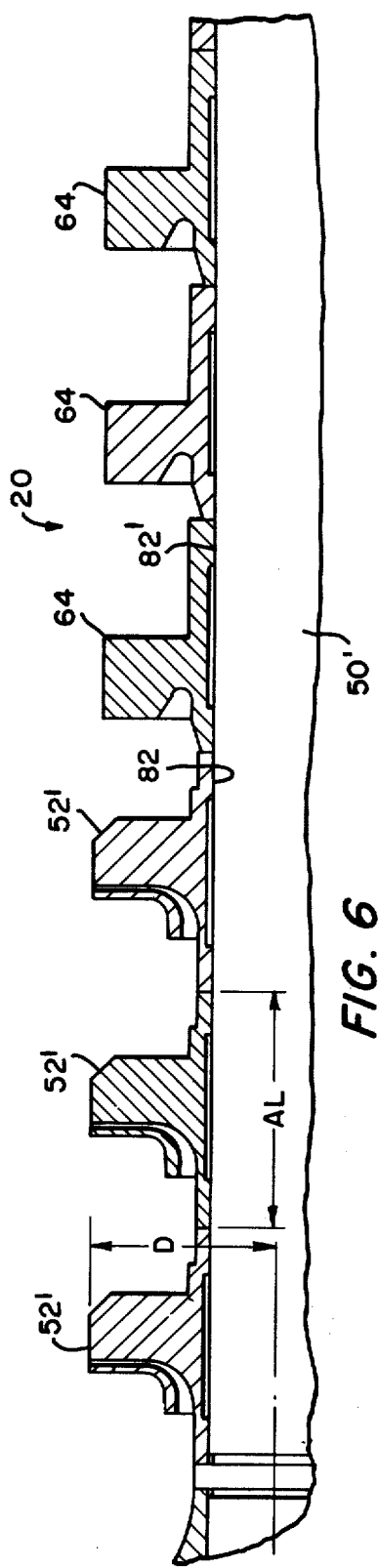
FIG. 6 is an axial illustration of the impeller shaft of the third compressor housing, with but halves of the impellers thereof shown in cross-section.

Housings 18 and 20 contain shafts 50 and 50', respectively (FIGS. 5, 5A, and 6) which are identical in length, weight and configuration. So also, the impellers 52 are identical in weight and axial length "AL" with impellers 52'. This is true, notwithstanding the fact that impellers 52 and 52' have different diameters D' and D. This is arranged by having impellers 52' with weighting metal downstream of the blade surface. The common weight and length of these rotor assemblies and the standard axial length of the impellers, greatly simplifies the fabrication, balancing, and alignment of the compressor unit 10.

While I have described my invention in connection with a specific embodiment thereof, it is to be clearly understood that this is done only by way of example, and not as a limitation to the scope of the invention, as set forth in the objects thereof and in the appended claims.

I claim:

1. A method of coupling first and second members, comprising the steps of:

forming said members with surfaces which, upon the latter being interjoined in a first engagement mode, effect a mutual, slidable engagement therebetween, and upon said surfaces being interjoined in a second engagement mode, defined by only a rotation of the surface of one said members relative to the surface of the other of said members, effect a torqued, interference fit therebetween;

slidably engaging said members in said first engagement mode; and rotating said surface of said one member relative to the surface of said other member; wherein said forming step comprises forming said surface of said first member with at least three equidistant and arcuate lobes, spacing said lobes apart from each other with intervening portions of said surface, and forming said intervening portions with only a convex shape, and forming said surface of said second member with at least three, equi-distant, lobe-accommodating arcuate recesses, spacing said recesses apart from each other with intervening, concave-shaped portions of said second member surface; and said first member comprises a compressor impeller shaft, and said second member comprises a compressor impeller.

* * * * *